US010083222B1

(12) United States Patent
Katzer

(10) Patent No.: US 10,083,222 B1
(45) Date of Patent: Sep. 25, 2018

(54) AUTOMATED CATEGORIZATION OF WEB PAGES

(71) Applicant: Sprint Communications Company L.P., Overland Park, KS (US)

(72) Inventor: Robin D. Katzer, Louisburg, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 259 days.

(21) Appl. No.: 15/084,170

(22) Filed: Mar. 29, 2016

(51) Int. Cl.
*G06F 17/30* (2006.01)

(52) U.S. Cl.
CPC .. *G06F 17/30598* (2013.01); *G06F 17/30117* (2013.01); *G06F 17/30864* (2013.01); *G06F 17/30887* (2013.01)

(58) Field of Classification Search
CPC ........... G06F 17/3089; G06F 17/30873; G06F 17/30864; G06F 17/30899; G06F 17/30867; G06F 17/30117; G06F 17/30887
See application file for complete search history.

(56) References Cited

U.S. PATENT DOCUMENTS

| | | | | |
|---|---|---|---|---|
| 7,788,274 B1 * | 8/2010 | Ionescu | ............. | G06F 17/30873 707/763 |
| 7,831,586 B2 * | 11/2010 | Reitter | ................ | G06F 17/2745 707/709 |
| 8,682,882 B2 * | 3/2014 | Xu | .................... | G06F 17/30867 707/706 |
| 2005/0004889 A1 * | 1/2005 | Bailey | ............... | G06F 17/30864 |
| 2006/0015509 A1 * | 1/2006 | Naitou | .............. | G06F 17/30884 |
| 2007/0100898 A1 * | 5/2007 | Petras | ............... | G06F 17/30699 |
| 2007/0156677 A1 * | 7/2007 | Szabo | ............... | G06F 17/30522 |
| 2007/0288431 A1 * | 12/2007 | Reitter | ................ | G06F 17/2745 |
| 2007/0288514 A1 * | 12/2007 | Reitter | ............. | G06F 17/30864 |
| 2008/0010683 A1 * | 1/2008 | Baddour | ........... | G06F 17/30864 726/24 |
| 2010/0228733 A1 * | 9/2010 | Harrison | ........... | G06F 17/30613 707/739 |
| 2011/0055195 A1 * | 3/2011 | Reitter | ................ | G06F 17/2745 707/710 |
| 2012/0254151 A1 * | 10/2012 | Reitter | .............. | G06F 17/30864 707/709 |
| 2012/0323898 A1 * | 12/2012 | Kumar | .............. | G06F 17/30899 707/723 |
| 2013/0144860 A1 * | 6/2013 | Xu | ...................... | G06F 17/3089 707/709 |

(Continued)

*Primary Examiner* — Jean M Corrielus

(57) ABSTRACT

A computer for identifying categories of web pages. The computer comprises a processor, a non-transitory memory, and an application stored in the non-transitory memory. When executed by the processor the application builds an unvalidated table of uniform resource locators (URLs) in the non-transitory memory based on crawling the World Wide Web, navigates to at least some of the URLs stored in the unvalidated table, analyzes web pages to identify keywords, evaluates the URLs to belong to one or more web page categories using web page categorization rules based on the identified keywords, stores an entry for each evaluated URL in a validated table in the non-transitory memory, each entry comprising the URL, the one or more categories associated to the URL, and the keywords identified in the web page associated to the URL, performs a frequency analysis of keywords associated to URLs, and adapts the web page categorization rules.

17 Claims, 8 Drawing Sheets

(56) References Cited

U.S. PATENT DOCUMENTS

| | | | |
|---|---|---|---|
| 2014/0115699 A1* | 4/2014 | Baddour ........... | G06F 17/30864 726/22 |
| 2015/0215326 A1* | 7/2015 | Baddour ........... | G06F 17/30864 726/22 |
| 2016/0086240 A1* | 3/2016 | Musgrove ......... | G06F 17/30864 705/26.2 |

* cited by examiner

AUTOMATED CATEGORIZATION OF WEB PAGES

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The World Wide Web can be thought of as the totality of content that can be accessed from web browsers via the public Internet. Commonly the content is structured as "web pages"—hypertext markup language (HTML) documents—that are served to web browser clients from web servers (host computers with access to data stores containing the content). When rendered by a web browser, the text and possibly images embedded in the HTML documents as a link to an image file is presented on a display screen. Often the HTML document embeds links to other content, and these links may be presented in the web page highlighted or otherwise indicated to be active links that can be selected.

A uniform resource locator (URL) may be viewed as a web address and may be used to access content on the World Wide Web via the public Internet. A URL may identify a protocol (e.g., http), a domain name or host name (e.g., example.com), and optionally a file name. For example, the URL http://patft.uspto.gov/embeds the fully qualified domain name "patft.uspto.gov"; the URL http://www.example.com/embeds the fully qualified domain name "example.com." The structure of the domain name comprises, from right to left, a top level domain (e.g., .gov, .com, .org, .net, .edu, and others), a second-level domain (e.g., uspto and example), a third-level domain (e.g., patft), and possibly other levels of domain name.

SUMMARY

In an embodiment, a method of crawling web pages and categorizing those web pages in a two-pass process used for delivering targeted content to a user equipment (UE) based on categories of web sites browsed by the UE is disclosed. The method comprises, for each uniform resource locater (URL) stored in a pool of unvalidated URLs (1) removing a URL from the pool of unvalidated URLs by an application executing on a server computer, (2) navigating to a web page referenced by the URL by the application, if navigating to the URL results in a redirect (3) discarding the URL removed from the pool of unvalidated URLs by the application. The method further comprises, for each URL in the pool of unvalidated URLs, if navigating to the URL does not result in a redirect (4) searching for keywords in the URL and in a title of the web page referenced by the URL by the application, (5) searching for URLs embedded in the web page referenced by the URL by the application, and (6) adding discovered embedded URLs to the pool of unvalidated URLs by the application. The method further comprises, for each URL in the pool of unvalidated URLs, if navigating to the URL does not result in a redirect (7) executing a plurality of primary web site categorization rules on the keywords associated with the web page referenced by the URL by the application, where each category primary rule is associated with a single category of web page, different category primary rules associate to different categories of web pages, and each category primary rule comprises a logical statement that is true if the keywords discovered in the title of the web page referenced by the URL or in the URL make the logical statement true and (8) associating the URL to each category whose category primary rule evaluates true by the application. The method further comprises, for each URL in the pool of unvalidated URLs, if navigating to the URL does not result in a redirect (9) executing a plurality of secondary web site categorization rules on the keywords associated with the web page referenced by the URL by the application, where each category secondary rule is associated with a single category of web page, different category secondary rules associate to different categories of web pages, and each category secondary rule comprises a logical statement that is true if the keywords discovered in the title of the web page referenced by the URL or in the URL make the logical statement true, (10) associating the URL to each category whose category secondary rule evaluates true by the application, and (11) saving the URL, the keywords associated with the web page referenced by the URL, and identities of categories to which the URL is associated in a pool of validated URLs by the application. The method further comprises, for each category of web page (1) counting the number of occurrences of different keywords in the URLs stored in the pool of validated URLs that are associated to the category by the application, (2) counting the number of URLs stored in the pool of validated URLs that are associated to the category by the application, and (3) for each different keyword that is not identified in a category primary rule or in a category secondary rule, determining by the application a percentage of the URLs that are associated to the category that are associated to the different keyword not identified in a rule versus the number of URLs stored in the pool of validated URLs that are associated to the category and for each said percentage that exceeds a predefined threshold percentage extending the logic of the category secondary rule by including the keyword associated with that said percentage. The method further comprises analyzing a web browsing history of a UE to determine URLs accessed by the UE that are stored in the pool of validated URLs, associating the UE to one or more categories associated to the browsed URLs that are stored in the pool of validated URLs, and sending content that is targeted to the UE based on the one or more categories associated to the UE.

In another embodiment, a server computer for identifying categories of web pages is disclosed. The server computer comprises a processor, a non-transitory memory, and an application stored in the non-transitory memory. When executed by the processor, the application builds an unvalidated table of uniform resource locators (URLs) in the non-transitory memory based on crawling the World Wide Web, navigates to at least some of the URLs stored in the unvalidated table and removes the URLs navigated to from the unvalidated table, and analyzes web pages associated with the URLs navigated to to identify keywords in the web pages. The application further evaluates the URLs to belong to one or more web page categories using web page categorization rules based on the keywords in the web pages associated with the URLs, stores an entry for each evaluated URL in a validated table in the non-transitory memory, each entry comprising the URL, the one or more categories associated to the URL, and the keywords identified in the web page associated to the URL, performs a frequency analysis of keywords associated to URLs according to web page category, and, based on the frequency analysis, adapts the web page categorization rules.

In yet another embodiment, a method of crawling web pages and categorizing those web pages according to dynamically adapting categorization rules for use in analyzing a subscriber of a wireless communication service provider based on categories of web sites browsed by a user equipment (UE) associated with the subscriber is disclosed. The method comprises crawling through the World Wide Web to discover uniform resource locators (URLs) and analyzing web pages accessed via the URLs to assign web page categories to each URL based on keywords identified in a URL or title of the web page accessed via the URL and based on categorization rules comprising logical statements. The method further comprises analyzing the assignment of web page categories to URLs to identify keywords commonly associated with the URLs assigned to the category that are not present in the categorization rules and to extend the categorization rules to include the keywords identified as commonly associated with the URLs assigned to the same web page category in an associated categorization rule, analyzing a web browser history of the UE to identify URLs browsed by the UE that are assigned web page categories, and, based on the web page categories assigned to the URLs browsed by the UE, associating the UE to one or more web page categories.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
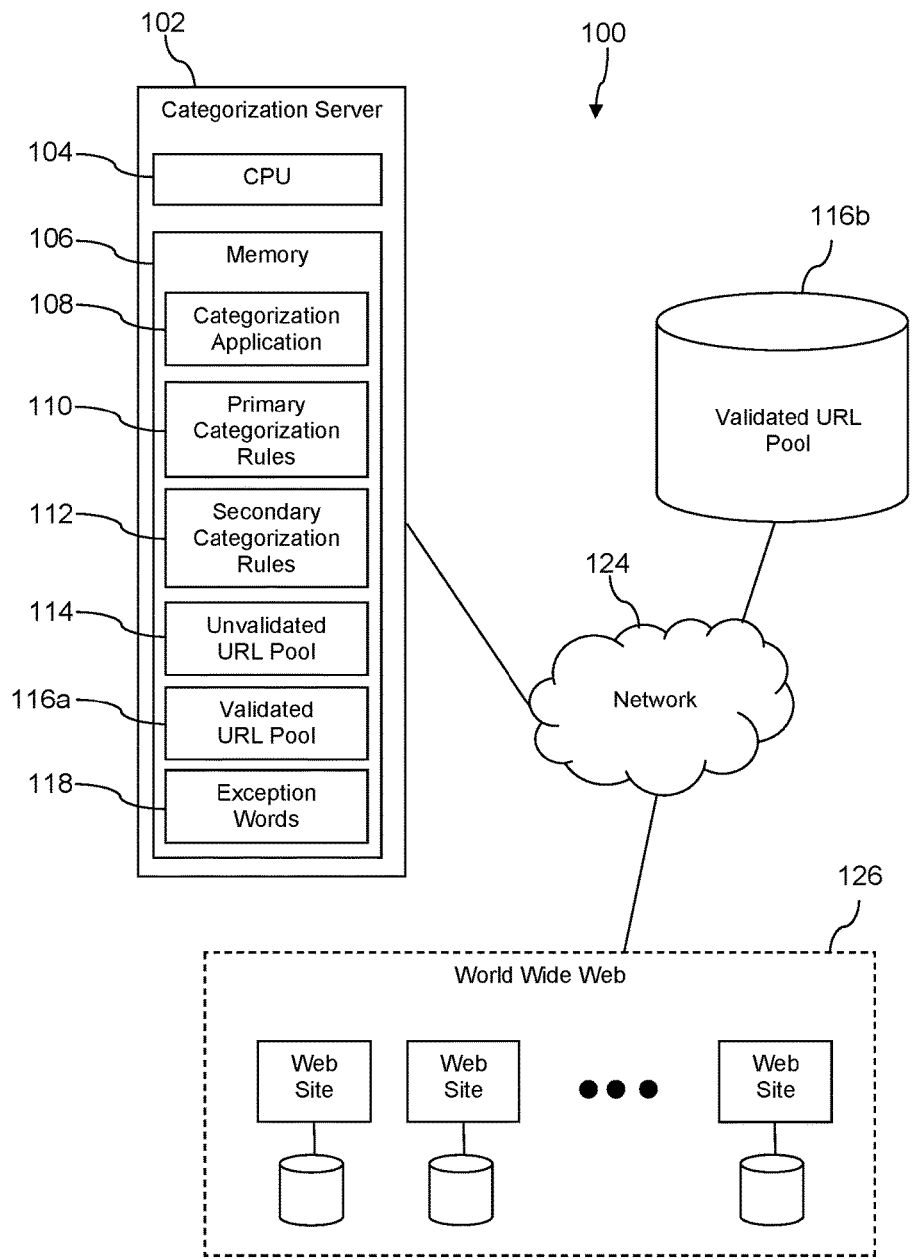
FIG. 1 is a block diagram of a portion of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches categorizing web pages, monitoring web sites browsed by a subscriber to communication services to identify a pattern of subscriber content consumption, and serving content and/or notifications to the subscriber based on the identified pattern. The pattern associates the subscriber with the categories of the web pages browsed by the subscriber. For example, a subscriber who visits web pages related to professional football and web pages related to amateur astronomy may be said to have established a web browsing pattern, specifically a sports pattern and a science & technology pattern (because the professional football web pages may be deemed to be associated with a sports web page category and because the amateur astronomy web pages may be deemed to be associated with a science & technology web page category). This patterning of the subscriber may be used to send a notification that detection of gravity waves has been confirmed to the subscriber (because detection of gravity waves is relevant to the category of science & technology) or to send a reminder that the Major League Baseball season opener is tomorrow (because the MLB season opener is relevant to the category of sports). Such concierge-like services may allow a communication service provider to differentiate itself from competing providers and enhance customer satisfaction and loyalty.

The categorization of web pages comprises several conceptually distinct operations which are yet interrelated or, in some cases, combined. An application "crawls" or "spiders" through the World Wide Web both to collect web pages to visit and to validate web pages. This functionality of the application may be referred to as a web crawler component or a web crawling function. The application takes an unvalidated uniform resource locator (URL) from a pool of unvalidated URLs, navigates to the web page identified by the URL, determines that the web page is valid (is reachable and does not entail a redirection operation), searches the web page for any embedded URLs, and stores the embedded URLs in the pool of unvalidated URLs.

In an embodiment, the URLs that are collected for validation and processing are restricted to second-level domain names (e.g., the top-level domain name plus the second-level domain name: upsto.gov, example.com). When an embedded URL comprising a third-level domain name or a fourth-level domain name is encountered while examining a web page, the application may strip off the third-level domain name and fourth-level domain name and add the truncated second-level domain name to the pool of unvalidated URLs. In another embodiment, the URLs that are collected are restricted to third-level domain names (e.g., the top-level domain name plus the second-level domain name plus the third level domain name: patft.uspto.gov) and second-level domain names. By successively visiting web pages, extracting embedded URLs, adding the extracted URLs to the pool of unvalidated URLs, and visiting the web pages associated with those extracted URLs, the application may be said to "crawl" or "spider" through the World Wide Web. The pool of unvalidated URLs may be initially populated with one or more manually inserted URLs (e.g., a "seed" or a plurality of "seeds"). The application can then move forwards growing the pool of unvalidated URLs based on visiting the manually inserted URLs.

At the same time that the application searches the web page for embedded URLs, it also categorizes the web page by identifying keywords in the URL of the web page and in a title of the web page. The URL and title are parsed to distinguish words which are referred to here as keywords. Special characters may be excluded from the keywords. Additionally, some words may be excluded, such as "and," "because," "their," and others.

Having extracted keywords from the web page, the application processes the keywords of the web page with a plurality of primary web page categorization rules—one primary categorization rule for each different predefined category of web page—and a plurality of secondary web page categorization rules. The categorization rules are defined in the form of logical statements. Examples of these categorization rules are provided hereinafter. When analyzing the keywords of a web page according to the logical statement of a categorization rule evaluates TRUE, the web page is deemed to be associated with the subject web page category. A web page may be associated with two or more web page categories, with a single web page category, or with no web page category (i.e., associated with the unknown web page category, a catchall category). The URL, the list of its keywords, and the identified categories to which the web page is associated are stored as an entry in a pool of validated URLs. The application may be configured to avoid introducing URLs into the unvalidated URL pool that have already been validated and stored in the validated URL pool or that have already been added to the unvalidated URL pool pursuant to analyzing another web page that embedded the same URL, thereby avoiding duplication of effort.

The primary web page categorization rules are crafted by an engineer or administrator of the application. The secondary web page categorization rules are defined by a form of machine learning. An application periodically reviews the entries in the pool of validated URLs to determine a frequency of occurrence of keywords for a single category that are not part of a categorization rule (either a primary or a secondary categorization rule). If it is determined that a keyword is frequently associated with the URL or the title of web pages associated with a subject category, this keyword may itself be predictive of association of web pages to the subject category and ought to be incorporated into the logical statement of a secondary categorization rule for the subject category. The application may also find that a keyword that is identified in a secondary categorization rule is associated infrequently with URLs and titles of web pages in the subject category and may remove the keyword from the secondary categorization rule. In this way, the secondary categorization rules may live and breathe to adapt with the changes in the World Wide Web. In an embodiment, the periodic review of keywords in the entries in the pool of validated URLs may further be used to adapt the primary categorization rules in a similar way. Thresholds for adapting the primary categorization rules may be set at stricter values, whereby to avoid oscillations or rapid changes in the primary categorization rules.

After the secondary categorization rules have been adapted as described above, the application analyzes all of the URLs in the validated URL pool using the primary web page categorization rules and the adapted secondary web page categorization rules. Because the secondary web page categorization rules may have changed, the categorization of some of the URLs in the validated URL pool may likewise change.

In an embodiment, over time, an engineer or administrator may review the secondary categorization rules and extend the primary categorization rules with keywords that have automatically been added to the secondary categorization rules. The engineer or administrator may, in association with the extension of the primary categorization rules, remove the keyword promoted to the primary categorization rule from the secondary categorization rule for a web page category. In another embodiment, however, keywords in the secondary categorization rules may not be promoted to the primary categorization rules, possibly on the theory that it is preferred to let the auto adaptation described above—the living and breathing of the secondary categorization rules, both adding keywords and at other times removing keywords from the secondary categorization rules—to operate. The use of primary web page categorization rules and secondary web page categorization rules may promote mixing both a permanent or at least long-term web page categorization based on stable rules and a transient, seasonal or event-oriented adapted web page categorization.

The present disclosure teaches an IT solution embodied in a system and in methods that provides an enhanced method of web crawling and a two-pass categorization of web pages to abstract meaningful information—actionable, tractable information—from the welter of Internet web pages. This actionable information supports valuable and useful inferences of user preferences that then can be used to improve the user experiences of his or her UEs and to earn his or her affiliation to the wireless communication service provider who is able to provide this improved experience. By building this actionable, tractable information, the system and methods provide efficiency and benefits to enable user installed applications as well, potentially, as server supported applications, to provide a variety of user-centric services. These user-centric services may be a variety of concierge-like services, as discussed in an example above. The user-centric services may promote sending targeted content to the UE, sparing the user meaningless, inappropriate ads or teaser headlines that may be distracting and/or annoying.

Turning now to FIG. 1, a system 100 is described. In an embodiment, the system 100 comprises a categorization server 102 having a processor 104 and a memory 106. The categorization server 102 may be a computer system. Computer systems are described further hereinafter. The memory 106 may comprise a non-transitory portion of memory 106 (e.g., non-transitory memory) and a transitory portion of memory 106 (e.g., transitory memory). Applications, scripts, and data may be stored in the non-transitory portion of memory 106, and some of the applications, scripts, and data may be loaded (i.e., copied) into the transitory portion of memory 106 for executing by the processor 104. In an embodiment, a categorization application 108, a set of primary categorization rules 110, a set of secondary categorization rules 112, an unvalidated URL pool 114, a validated URL pool 116*a*, and a list of exception words 118 may be stored in the non-transitory portion of the memory 106. It is understood that the unvalidated URL pool 114 may be stored in a data store that may be embodied outside of the categorization server 102.

Additionally, the validated URL pool 116*a* may be embodied outside of the categorization server 102, for example in a validated URL pool data store 116*b*. In an embodiment, the system 100 may comprise both the validated URL pool 116*a* embedded within the categorization server 102 and the validated URL pool data store 116*b* (i.e., the validated URL pool data store 116*b* is a copy of the validated URL pool 116*a*). It is understood that the categorization application 108 may be architected in a variety of ways. In an embodiment, the functionality attributed here to the categorization application 108 may be provided by multiple applications. In an embodiment, the categorization application 108 may be subdivided into a plurality of components. The categorization application 108 may execute on a plurality of categorization servers 102.

The system 100 further comprises a network 124 that comprises one or more public networks, one or more private networks, or a combination thereof. The system 100 further comprises the World Wide Web 126. While it is customary to conceptualize the World Wide Web 126 as a part of the network 124, it is illustrated separately here because one of the behaviors of the categorization application 108 is to "crawl through the World Wide Web." As is known to those skilled in the art, the World Wide Web 126 comprises a very large number of web sites. According to some estimates, there may be in excess of 300 million second-level domain names on the World Wide Web 126.

The categorization application 108 may spawn a plurality of job threads to process unvalidated URLs from the unvalidated URL pool 114. Each job thread may process one unvalidated URL. The job removes a URL from the unvalidated URL pool 114 and navigates to the web page addressed by the URL. If attempting to navigate to the URL does not find a web page or results in a redirection, the initial URL may be deemed invalid and is discarded. In an embodiment, a redirection URL (the URL identified in the redirection message) may be stored in the unvalidated URL pool 114 for later processing. If the URL is valid, the job parses the literal URL and the title of the associated web page to determine a list of keywords associated with the URL.

These keywords exclude special characters such as '#', '&', and the like, and comprise only alphanumeric characters. The list of keywords further excludes some common words that are stored in the list of exception words 118. The following is a list common words that may be excluded (i.e., may be included in the list of exception words 118):

a, about, after, all, also, an, and, any, as, at, back, be, because, but, by, can, come, could, day, do, even, first, for, from, get, give, go, good, has, have, he, her, him, his, how, I, if, in, into, is, it, its, just, know, like, look, make, me, most, my, new, no, not, now, of, on, one, only, or, other, our, out, over, people, say, see, she, so, soon, take, than, then, that, the, their, them, there, these, they, think, this, time, to, two, year, you, your, up, us, use, want, way, we, well, what, which, when, who, will, with, work, would It is understood that in an embodiment not all of these words may be excluded. Additionally, it is understood that in an embodiment other words not listed here may be excluded from consideration as keywords. It is observed that words may be excluded that have little value in differentiating between different categories of web pages. For example, it would not be surprising to find the word 'good' in a URL or title of a web page of any category of web page, hence the word 'good' may not have much value for categorizing web pages and may desirably be excluded.

The job then processes the list of keywords associated with the URL with each of a plurality of primary categorization rules 110, one rule for each different category of web page. In an embodiment, there may be about 27 different web page categories (including a catchall 'unknown' category), but it is understood that the present disclosure contemplates applying the teachings herein with fewer different web page categories and with more different web page categories. The primary categorization rules 110 are logical statements that evaluate to TRUE if the set of keywords for a URL satisfy the regular expression defined in the subject categorization rule. The keywords for a URL may evaluate to TRUE for two or more categorization rules. The URL is deemed associated with the category for all categorization rules that evaluate TRUE, hence the URL can be deemed associated with two or more different categories.

Below is an example set of primary categorization rules 110.

<Category Id><Category>:<Rules>
Rule Types
| —Logical Or
&—Logical And (This operation is done first before logical Or's)
[n]—Has to occur at least n number of times
<keyword>[n]&(<key ord>|<keyword>& . . . )—keyword has to exist at least n times with one of the following keywords in the parens.
{word}—This word is contained within another word, i.e. {Hotel} is within Hotels, also looks at the URL for the embedded word.

<word>&!<word>—<word>exists and not this <word>, the NOT only works with the AND (To Be Developed)
1:Blog:Blog|Blogger
2:Consortium:Consortium|W3
3:Science&Technology:
  Developer|Developers|Software|Java|Apple&Swift|-
  C++|Programming&(C|Engineering)
  |C#|C&Sharp|VB|PHP|Android&Forums|Altova|Git-
  hub|Oracle&(Union)|Data&(Science|Mining)|Tech-
  |Bioscience|Rackspace|Gravity|Technology|Python-
  |Innovation|Aerospace|CGI|Microsoft
4:Entertainment:Entertainment|Netflix|Youtube-
  |Comic|Book|Celebrity|Fashion|Magazine|Movie|-
  Show|Theatre|Games|Wikia|Field&Stream|Hunter
5:Food:Food|Tasting|Cooking|Cook|Meat|Bread-
  |Milk|Eggs|Tacos|Breakfest|Tastes
6:Library:Books&(Library|Reading|Review)|Library-
  |bookshelves
7:Merchant:Merchant|Store|Dealership|Mall|Gift|Gifts-
  |Apparel|Deal|Sale|Sell|Save[3]|Women|Electronic-
  s|Prices|Discounts|Buying|-
  iTunes|Daily&Deals|Shopping&Price|EBay|-
  Roasted&Blend
8:Music:Music|Singer|Band|Jazz|Rock|Radio
9:News:Gazzette|Headline|Headlines|Forbes|News|Journal|{Newsletter}|CBS|{Harald}|USAToday|USA&-
  Today|Business|Obituaries|Wikia|History|Dino-
  saurs|Newsweek|NRA|Newspaper|politics|Transter-
  restrial|MS NBC|Times|SportsCenter|Journalists|jour-
  nal-ism|Post|Drudge&Report|{AlJazeerah}
10:Pets:Dog|Cat|Cats|Gerbles
11:Government:
  {Politician}|President|Senator|Congress|Congress-
  man|Democracy|politics|Government|{.gov}|Demo-
  cratic
12:Pornography:Pornography|XXX|Porn|Sex[3]|<literal for genitalia>
13:Religion:Religion|Church|Synagogue|Congregation-
  |Shalom|Temple|Catholic|Crux|Christian|faith
14:Restaurant:Pub|Reservation|Café|Restaurant|Café
15:School:School&(Public|High|Middle|Grade|Learn)
  |College|University|Courses&(Universities|Boot-
  camps)|edu|Tutorial|Graduate|Insti-
  tute&Technology|Tech&Catalog|{.edu}|Education
16:Social
Media:Social&(Media|Club)|Facebook|Twitter-
  |Share|LinkedIn|Net-
  work|Genealogy|{blog}
17:Spirits:Spirits|Wine|Beer|Liqueur|Whiskey|Tequila|Vodka 18:Sports:Sports|Football|Baseball|Soccer|Hockey|M-LB|NFL|NCAA|NASCAR|UFC|WWE|ESPN|Athletics|Golf|PGA|FantasyScore|SportsCenter|{College}&{Sports}|{Masters}|League&Ball
19:Transportation:Transportation|Bus|Uber|Taxi|Shuttle-|Train|Transit|Rail|Auto|Autos|{rental}&{car}|Cars
20:Travel:Hotel|Hotels[2]|Hotels&(Ritz|Resorts|Inn)|Cabin|motel|Campground|Camp&Ground|Lodging|Airline|Travel|Marriott
21:Weather:Weather|Storm|Sunny|Rain|Hurricane|Volcano|Mud&Slide|Alert|{Climate}
22:Search:Search[2]|Results&(Web|Search|Pages)|Search&Site|Google|Yahoo|AOL
23:Medical:Red&Cross|Medical|Pharmaceutical|Biological|prosthetic|MRI|Orthopedic|Musculoskeletal|Cancer
24:Finance:Financial|Investors|Investments|{Economist}|Loans|Lenders|{Economic}
25:Military: USSOCOM|USPACOM|USCG|US&Coast&Guard|-Marines&Corps|Military
26:Law Enforcement:CSI|Police|Law&(Enforcement|Court|Sentencing)|Crime|{Criminal}|TDCAA|Legal
99:Unknown:

It is understood that in different embodiments, the primary categorization rules 110 may differ from this set of example rules.

As an example, the Spirits web page category rule listed above is: Spirits|Wine|Beer|Liqueur|Whiskey|Tequila|Vodka. The vertical lines represent a logical OR operation. If a list of keywords for a URL comprise {Tuesday, Hotel, Store, Vodka, . . . } the Spirits category rule would evaluate TRUE because of the presence of the word Vodka. The same words could be present multiple times and the rule would still evaluate TRUE. Other lists of keywords such as {Tuesday, Hotel, Store, Spirits, . . . } {Tuesday, Hotel, Store, Wine, . . . } {Tuesday, Hotel, Store, Beer, . . . } {Tuesday, Hotel, Store, Liqueur, . . . } {Tuesday, Hotel, Store, Tequila, . . . } would each evaluate TRUE. The URLs associated with each of these keyword lists would be associated with the Spirits web page category. Because the Travel web page category rule includes the word "Hotel," the URLs associated with each of these keyword lists would also be associated with the Travel web page category.

In some cases the category rule includes a logical AND, forming a kind of compound word. Thus, the Military category rule includes the compound keyword "US&Coast&Guard." A list of keywords {Tuesday, Hotel, US, Coast, Guard, . . . } would evaluate TRUE for the example Military web page category rule given above. The list of keywords {Tuesday, Hotel, Coast, Guard, . . . } would evaluate FALSE, because it omits the "US" logically required by the AND clause. It is observed that the web page categorization rules presented above are for purposes of illustrating categorization rules and may not be robust or perfected. The categorization rules may stipulate that a keyword be repeated 2 or more times to satisfy a criteria or sub-criteria.

As an example of rule crafting, if a primary categorization rule includes keywords "Soccer" and "Hockey" and analysis shows that the keyword "Goal" occurs 60% of the time in the list of keywords of URLs associated to the subject category (Sports) the rule for the category may be amended to include a clause where "goal" is logically ANDed with the logical OR of "Soccer" with "Hockey": "Goal&(Soccer|Hockey)." Another possible primary categorization clause may add a word conjoined with the primary categorization rule with a logical OR operation if it is determined that the word occurs 80% of the time in a list of keywords for URLs associated with the subject category.

While not illustrated in the example web page categorization rules presented above, it is contemplated that categorization may take into account the categorization of a web page from which the URL under analysis was reached. Thus, if web page A embeds a URL directing to web page B, the categorization of web page A may be taken into account when categorizing web page B. This web page categorization strategy may be referred to as inheritance categorization or "FROM" categorization. It is further contemplated that the categorization of web pages having URLs embedded in a web page referenced by a URL under analysis may be taken into account. Thus, if web page B embeds URLs referencing web page C and web page D, the categories of web page C and web page D may be taken into account when categorizing web page B. This web page categorization strategy may be referred to as transmission categorization or "TO" categorization. It is understood that the FROM and TO categorization strategies may be used in combination with other indicators, possibly to break ties or to increase confidence in a web page categorization. In an embodiment, the TO categorization strategy may require that a plurality of downstream web pages have at least one web page category in common to deem the upstream or parent web page to belong to that web page category (in the absence of a keyword of the parent web page evaluating TRUE for the category).

After processing the list of keywords of the URL according to the primary classification rules 110, the job processes the list of keywords of the URL according to the secondary categorization rules 112. The secondary categorization rules 112 have a similar logical syntax and structure to the example primary categorization rules 112 but may be directed to keywords not included in some of the primary category rules.

After processing the list of keywords of the URL using the primary and secondary classification rules, the job stores the URL, the list of keywords of the URL, and all associated categories in the validated URL pool 116a and possibly the validated URL pool data store 116b. The job also reads the web page of the URL. If the job finds URLs embedded in the web page, it adds those embedded URLs to the unvalidated URL pool 114. In an embodiment, the job restricts the URLs added to the unvalidated URL pool 114 based on a filtering criteria. For example, the job may only add second-level domain name URLs to the unvalidated URL pool 114. Alternatively, the job may strip off third-level domain name portions of the embedded URL and/or fourth-level domain name portions of the embedded URL to form a second-level domain name URL which is added to the unvalidated URL pool 114.

In an embodiment, the job stores an indication of the URL it is processing in the entry for embedded URLs that it places on the unvalidated URL pool 114, which may be useful for inheritance processing when categorizing the embedded URL, as discussed hereinafter. The job may also analyze the body text of the web page to help in categorizing the URL. In an embodiment, the body text of the web page is only used to help categorize the URL if the above described processing with the primary categorization rules 110 and the secondary categorization rules 112 have failed to associate the URL to a web page category (excluding the "unknown" web page category). The analysis of the body text of the web page may rely upon phrase matching to establish association with a web page category. The job may then destroy itself or terminate. It is understood that any number of job threads may be executed concurrently by the categorization application 108, for example based on the processing power of the processor 104 and/or based on the number of URLs in the unvalidated URL pool 114.

The categorization application 108 may periodically analyze the entries in the validated URL pool 116a or validated URL pool data store 116b to identify new categorization rules to add to the secondary categorization rules 112 or to extend rules already present in the secondary categorization rules 112. The basic approach is to find keywords that occur frequently in the keyword list of URLs associated to a given category but that are not currently part of a primary categorization rule or a secondary categorization rule for that given category. In an embodiment, if a keyword, not present in either a primary or a secondary categorization rule for a given category, is found to be present in more than 40% of the keyword lists of URLs associated to the given category, it will be integrated into a secondary categorization rule, for example in an OR clause. Alternatively other thresholds for inclusion in secondary categorization rules can be used such as more than 30%, more than 35%, more than 45%, more than 50%, more than 60%, more than 75%, or some other threshold.

In an embodiment, keywords that form part of a secondary categorization rule that are found to be rarely in the keyword list of URLs associated to a given category may be removed from the secondary categorization rules 112. For example, a keyword that is present in less than 10% of keyword lists for URLs associated to the given category may be removed from the secondary categorization rules 112. Alternatively other thresholds for exclusion from the secondary categorization rules 112 can be used such as less than 15%, less than 20%, less than 25%, or some other threshold. Desirably there is a gap between the exclusion threshold and the inclusion threshold to avoid a kind of dithering or oscillation of exclusion-inclusion toggling for a keyword in a secondary categorization rule. Removing a keyword from the secondary categorization rules 112 may comprise deleting the subject keyword and a linked logical operator from one or more rules or removing a rule for a category entirely (in the event that the subject keyword is a sole criteria for qualifying a web page for the subject category).

In an embodiment, a keyword that is common to many primary and secondary categorization rules may be excluded from all of those secondary categorization rules, because the keyword may not be deemed to be differentiating. Such an excessively common keyword may also be added to the list of exception words 118. The threshold of excessively common keyword may be more than 33% of categories include the keyword in either a primary or a secondary categorization rule. Alternatively, the threshold may be more than 45% of categories, more than 50% of categories, more than 60% of categories, more than 75% of categories, or some other threshold.

In an embodiment, after the categorization application 108 has completed analyzing the validated URL pool 116a and/or the validated URL pool data store 116b and revised the secondary categorization rules 112, it recategorizes all the URL entries in the validated URL pool 116a/116b based on the primary categorization rules 110 and the revised secondary categorization rules 112. Because of the modifications of the secondary categorization rules 112, the categorization of the URLs may have changed. In an embodiment, the cycle of adapting the secondary rules based on analyzing the entries in the validated URL pool 116a, 116b and recategorizing all the URL entries in the validated URL pool 116a/116b based on the primary categorization rules 110 and the revised secondary categorization rules 112 may be performed continuously. "[C]ontinuously" is meant, after analysis and adaptation of the secondary categorization rules 112 the URL entries are recategorized in the validated URL pool 116a/116b; after recategorization, analysis and adaptation is repeated, and so on. The process of recategorization of URLs in the validated URL pool 116a/116b may be referred to as refreshing the categorization of URLs or as keeping the categorization of URLs evergreen.

Alternatively, the cycle of adapting secondary rules and recategorizing may be performed periodically, for example once per week, once every two weeks, once per month, once per quarter, or on some other periodic interval. Alternatively, or in addition, the cycle of adapting secondary rules and recategorizing URLs may be performed in response to an event or in response to manual initiation by a system administrator or an operator of the categorization server 102. Such an event driven triggering may be referred to in some contexts as one-shot execution. In an embodiment, the recategorization may include navigating to the URLs to assure that they remain active and valid. If a URL is not accessible, the URL may be removed from the validated URL pool 116a, 116b.

Figure 2:
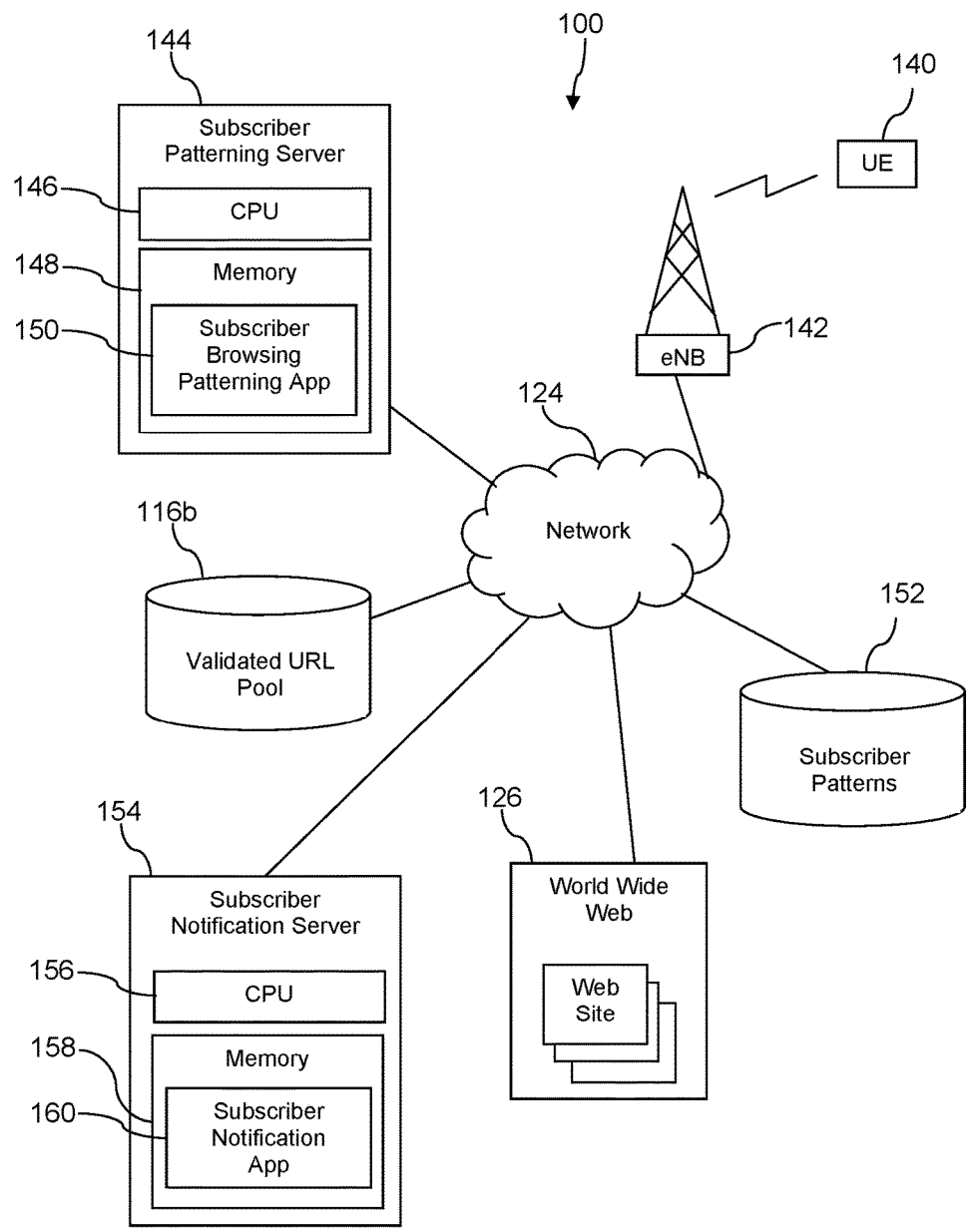
FIG. 2 is a block diagram of another portion of the communication system according to an embodiment of the disclosure.

Turning now to FIG. 2, further details of the system 100 are described. The system 100 may further comprise a subscriber patterning server 144 comprising a processor 146, a memory 148, and a subscriber browsing patterning application 150. The subscriber patterning server 144 may be a computer system. The memory 148 may comprise a non-transitory portion of memory 148 and a transitory portion of memory 148. The subscriber browsing patterning application 150 may be stored in the non-transitory portion of memory 148 and may be loaded (i.e., copied) into the transitory portion of memory 148 to be executed by the processor 146. The system 100 may comprise an enhanced node B (eNB) 142, a base transceiver station (BTS), or cell tower that establishes a wireless communication link with a user equipment 140 according to one or more of a long term evolution (LTE), a code division multiple access (CDMA), a global system for mobile communications (GSM), a worldwide interoperability for microwave access (WiMAX), or a Wi-Fi wireless communication protocol. The UE 140 may be a mobile phone, a smart phone, a personal digital assistant (PDA), a media player, a wearable computer, a headset computer, a laptop computer, a tablet computer, or a notebook computer. It is understood that the system 100 may comprise any number of UEs 140 and eNBs 142.

The eNB 142 may communicatively couple the UE 140 to the network 124, for example to complete voice calls and to complete data calls. A browser of the UE 140 may navigate to and download content from web sites (e.g., web servers) on the World Wide Web via the eNB 142 and the network 124. The subscriber browsing patterning application 150 may monitor the browsing of the UE 140 or alternatively receive reports of the browsing of the UE 140. The subscriber browsing patterning application 150 may identify URLs browsed to by the UE 140, look-up the web page category or categories associated to the URLs browsed by the UE 140 in the validated URL pool data store 116b, and may deem the subscriber of the UE 140 to be associated with the web page categories of the URLs browsed by the UE 140. The subscriber browsing patterning application 150 may copy the web page categories of the URLs associated with the UE 140 or the subscriber of the UE 140 as a subscriber pattern in a subscriber patterns data store 152. The subscriber patterns may be appended or intercalated with a profile of the subscriber that includes other information such as demographic information (age, educational level, marital status, gender, and the like) as well as on-line purchase history, and other profile information.

In an embodiment, the subscriber browsing patterning application 150 may perform statistical analysis of the browsing activities of the UE 140. For example, the browsing patterning application 150 may only associate the UE 140 and/or the subscriber of the UE 140 to a web page category that 30% of the URLs the UE 140 browses to are associated with. Said in other words, the browsing patterning application 150 may not associate the UE 140 or subscriber of the UE 140 to web page categorizations which the UE 140 browses infrequently. The browsing patterning application 150 may associate the UE 140 to a plurality of web page categories.

The subscriber browsing patterning application 150 may analyze the browsing activities of the UE 140 periodically, for example once per week, once per month, once per quarter, or on some other periodic interval. When performing a periodic analysis of browsing activities, the subscriber browsing patterning application 150 may consider only a recent portion of the browsing activities of the UE 140, for example only browsing activity that has occurred since the last periodic analysis of browsing activities or over the last two periodic analyses or over the last three periodic analyses. In some cases, the length of browsing activity that is considered during periodic analysis may be greater than the periodic interval. In an embodiment, the browsing activities are weighted with reference to time, giving more weight to recent browsing activities and less weight to older browsing activities in determining the pattern of browsing activities of the UE 140. When the subscriber browsing patterning application 150 periodically analyzes the browsing activities of the UE 140, the pattern of browsing determined may replace the previous browsing pattern associated with the UE 140 in the subscriber patterns data store 152. Alternatively, the previously defined or constructed browsing pattern associated with the UE 140 and stored in the subscriber patterns data store 152 may be extended by addition of any new web page categorizations associated with the UE 140. Thus, associations of web page categories to the UE 140 may remain in place across a plurality of periodic browsing activity analyses by the subscriber browsing patterning application 150. In an embodiment, the subscriber browsing patterning application 150 may remove web page categories from a subscriber pattern in the subscriber patterns data store 152 when the analysis has not associated the subject UE 140 to the web page category for several cycles of periodic browsing pattern analysis.

By restricting analysis to a recent portion of the browsing activities of the UE 140, the pattern of the UE 140 can track changes of the interests or tastes of the subscriber of the UE 140 over time or as seasons change. For example, the UE 140 may exhibit interest in bicycle related web pages (and hence the sports web page category) around the time of the Tour de France bicycle race in early July and may exhibit interest in college basketball related web pages (and hence the sports web page category) around the time of the NCAA basketball tournament in mid-March. But after the Tour de France race is over and before the NCAA basketball tournament, the UE 140 may not browse sports related web sites and instead may browse web sites related to the Perseid meteor shower in mid-August and the Orionid meteor shower in late October (and hence the science & technology web page category).

The system 100 may further comprise a subscriber notification server 154 that comprises a processor 156, a memory 158, and a subscriber notification application 160. The subscriber notification server 154 may be a computer system. The memory 158 may comprise a non-transitory portion of memory 158 and a transitory portion of memory 158. The subscriber notification application 160 may be stored in the non-transitory portion of memory 158 and may be loaded (i.e., copied) into the transitory portion of memory 158 to be executed by the processor 156. The subscriber notification application 160 may determine to send a communication or other notification to the UE 140 based on the subscriber pattern associated with the UE 140. For example, the subscriber notification application 160 may search the subscriber patterns 152 to identify all UEs 140 or subscribers of the UEs 140 that associate to a web page category or that associate to the specific web page category and also satisfy other filtering criteria (e.g., location, residence location, age, gender). The subscriber notification application 160 may then send communications or notifications out to each of those selected UEs 140 or subscribers of UEs 140. The communications or notifications may be reminders about events the subscriber of the UE 140 is expected to be interested in, such as sports related events for a UE 140 associated to a sports web page category or amateur astronomy related events for a UE 140 associated to a science & technology web page category. The notifications may be about an opening of a new retail store related to a web page category associated to the UE 140. The notifications may be mobile advertisements targeted to the UE 140 based on the subscriber pattern associated with the UE 140.

Figure 3A:
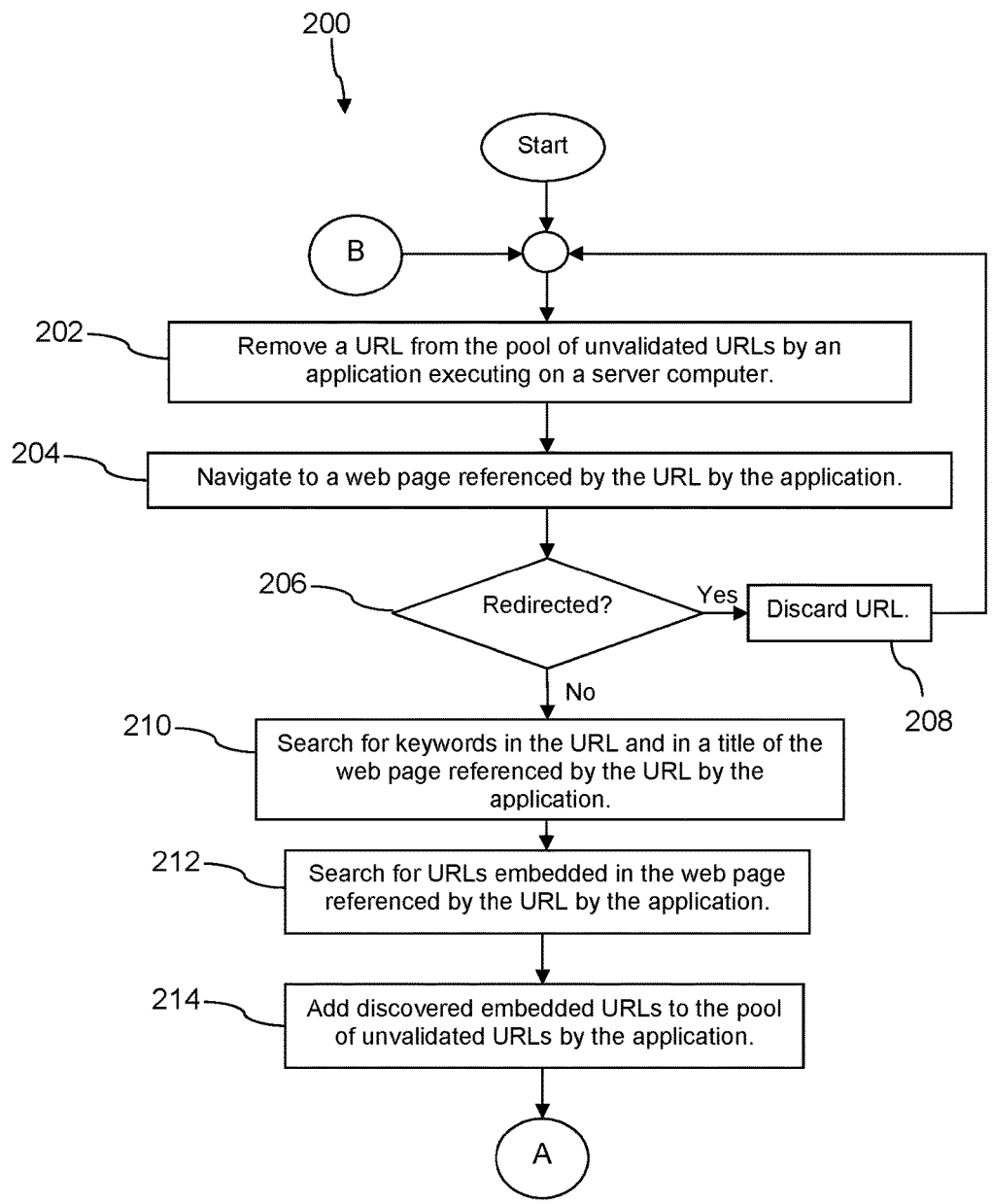
FIG. 3A and FIG. 3B is a flow chart of a method according to an embodiment of the disclosure.
Figure 3B:
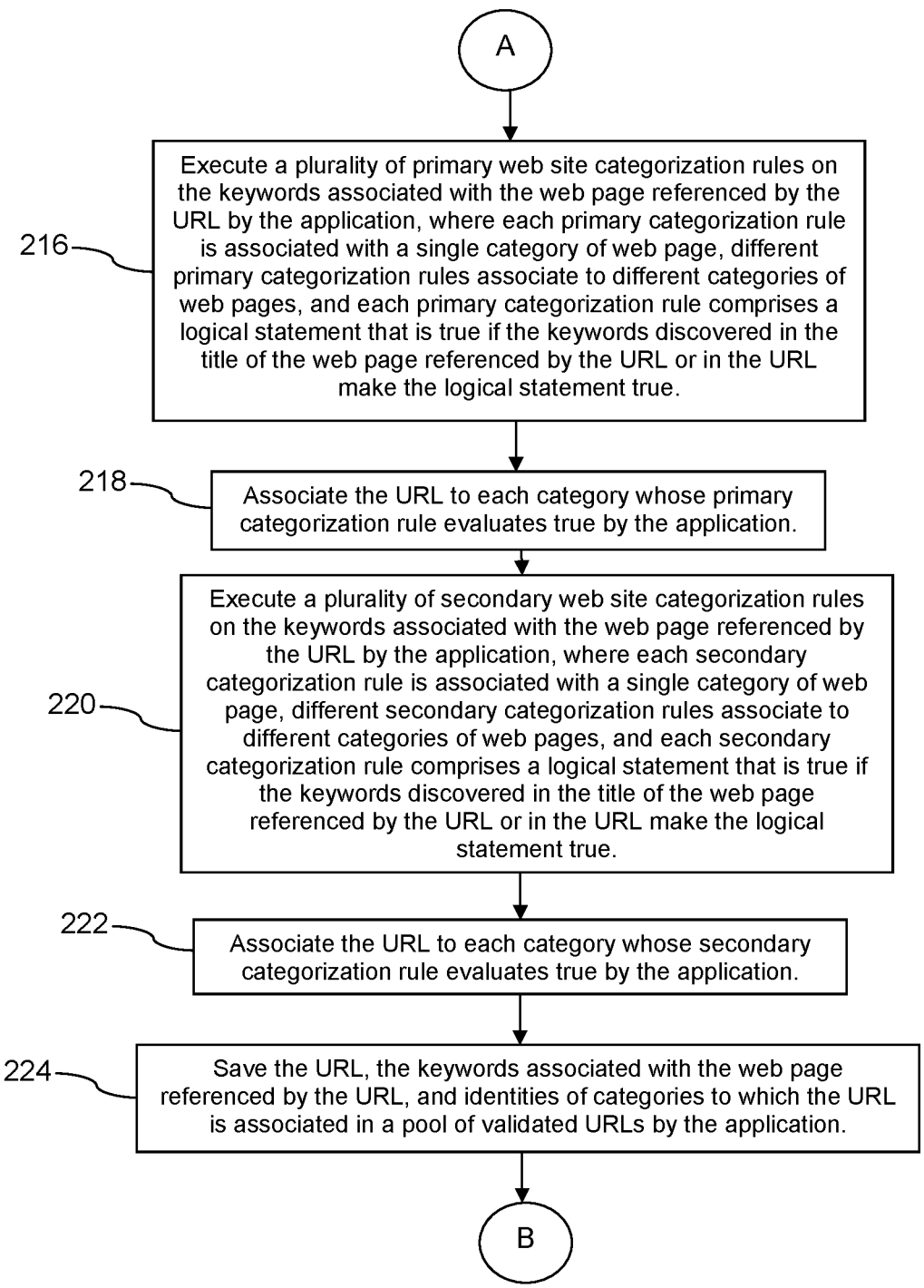

Turning now to FIG. 3A and FIG. 3B, a method 200 is described. In an embodiment, the method 200 may be performed by the categorization application 108 executing on the categorization server 102. At block 202, a URL is removed from the unvalidated URL pool 114. At block 204, the categorization application 108 navigates to the web page referenced by the URL. At block 206, if the categorization application 108 is redirected (e.g., a HTTP 301 message or a HTTP 302 message is received by the categorization application 108), the processing proceeds to block 208 where the initial URL is discarded. The process then returns to block 202. In an embodiment, the URL to which the process is redirected is added to the unvalidated URL pool 114. Alternatively, in an embodiment, when the process is redirected to a URL, the initial URL is discarded and processing of the redirect URL is continued at block 210. Before proceeding to analyze the web page associated with the redirect URL at block 210, the process may first check the validated URL pool 116 to assure that the redirect URL has not previously been processed. If the redirect URL has been processed (i.e., an entry for the redirect URL is found in the validated URL pool 116), the process does discard the redirect URL at block 208 and returns to block 202.

At block 206, if the categorization application 108 is not redirected, the processing proceeds to block 210 where the categorization application 108 searches for keywords in the URL and in a title of the web page referenced by the URL. The categorization application 108 may remove special characters such as '#', '&', and other non-alphanumeric characters. The categorization application 108 may also ignore words listed in the exception words list 118. At block 212, the categorization application 108 searches within the web page referenced by the URL for URLs embedded in the body text of the web page. In an embodiment, the categorization application 108 further searches for keywords within the web page.

At block 214, the categorization application 108 adds discovered embedded URLs to the unvalidated URL pool. In an embodiment, the categorization application 108 adds only embedded URLs that satisfy a criteria, for example selects only URLs that comprise second-level domain names. In an embodiment, the categorization application 108 may parse URLs, strip off file names, and store only the URL of the embedded second-level domain name in the unvalidated URL pool 114. In an embodiment, the categorization application 108 verifies that the discovered embedded URL is not already in the unvalidated URL pool 114, in the validated URL pool 116a, or in the validated URL pool data store 116b. If the discovered embedded URL is in the unvalidated URL pool 114 or in the validated URL pool 116, the categorization application 108 discards the subject URL.

At block 216, the categorization application 108 executes a plurality of primary web site categorization rules on the keywords associated with the web page referenced by the URL, where each primary categorization rule is associated with a single category of web page, different primary categorization rules associate to different categories of web pages, and each primary categorization rule comprises a logical statement that is TRUE if the keywords discovered in the title of the web page referenced by the URL or in the URL make the logical statement TRUE. At block 218, the categorization application 108 associates the URL to each category whose primary categorization rule evaluates TRUE.

At block 220, the categorization application 108 executes a plurality of secondary web site categorization rules on the keywords associated with the web page referenced by the URL, where each category secondary rule is associated with a single category of web page, different category secondary rules associate to different categories of web pages, and each category secondary rule comprises a logical statement that is TRUE if the keywords discovered in the title of the web page referenced by the URL or in the URL make the logical statement TRUE. At block 222, the categorization application 108 associates the URL to each category whose category secondary rule evaluates TRUE. At block 224, the categorization application 108 saves the URL, the keywords associated with the web page referenced by the URL, and the identities of categories to which the URL is associated in the validated URL pool 116 (in one or both of the validated URL pool 116a and the validated URL pool data store 116b).

By stepping through blocks 202 through 224 a single URL may be validated and moved from the unvalidated URL pool 114 to the validated URL pool 116. By reiterating blocks 202 through 224, the unvalidated URLs in the unvalidated URL pool 114 may be processed. In an embodiment, a separate thread is spawned or launched by the categorization application 108 to perform the processing of blocks 202 through 224 for each unvalidated URL.

Figure 4:
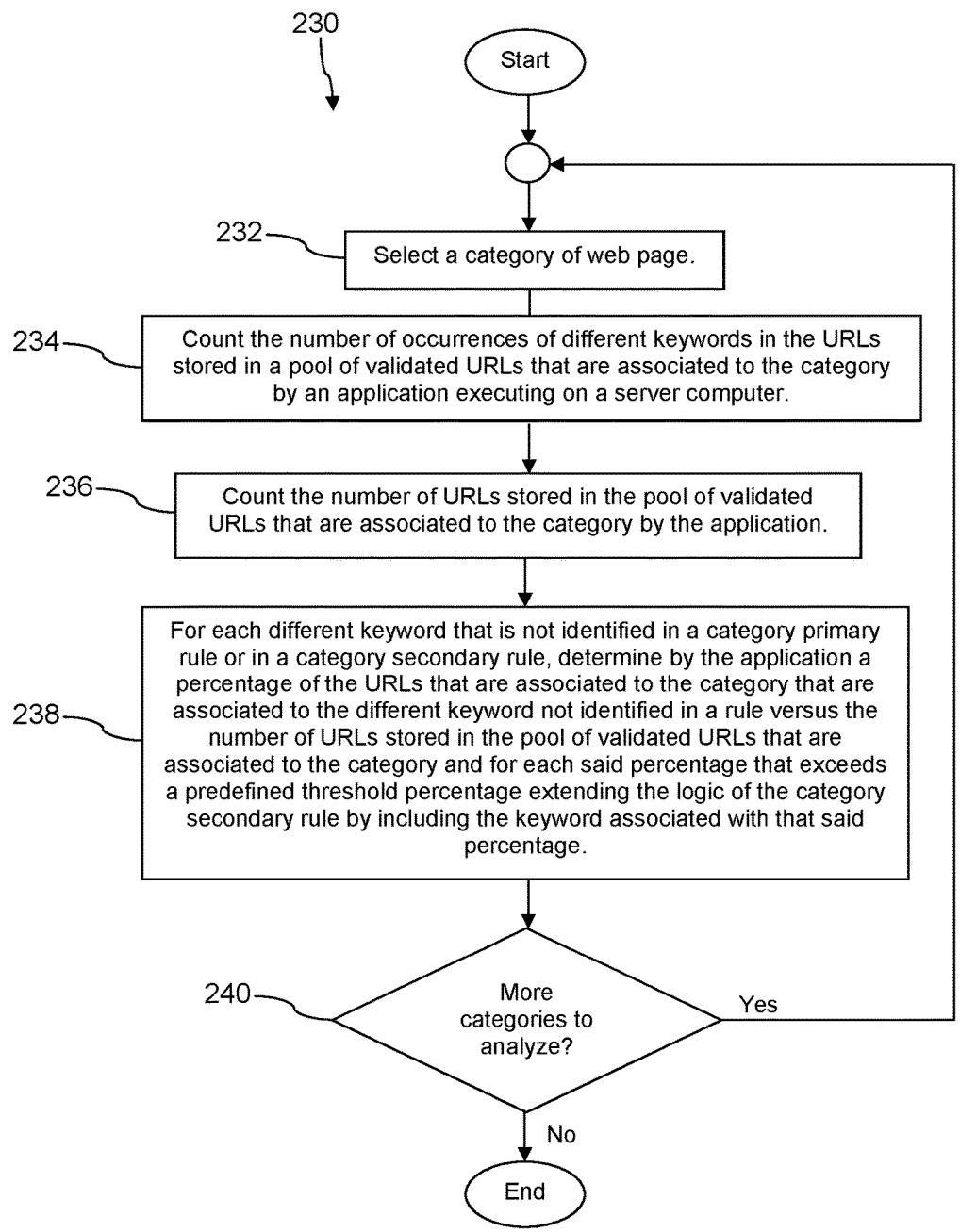
FIG. 4 is a flow chart of another method according to an embodiment of the disclosure.

Turning now to FIG. 4, a method 230 is described. In an embodiment, the method 230 may be performed by the categorization application 108 executing on the categorization server 102 or may be performed by another application on a different server. At block 232, the application selects a category of web page. At block 234, the application counts the number of occurrences of different keywords in the URLs stored in the validated URL pool 116 that are associated to the category. At block 236, the application counts the number of URLs stored in the validated URL pool 116 that are associated to the category. In an embodiment, the processing of block 234 and 236 may be combined in a single integrated step.

At block 238, for each different keyword that is not identified in a primary categorization rule or in a secondary categorization rule, determine by the application a percentage of the URLs that are associated to the category that are associated to the different keyword not identified in a rule versus the number of URLs stored in the pool of validated URLs that are associated to the category and for each said percentage that exceeds a predefined threshold percentage extending the logic of the category secondary categorization rule by including the keyword associated with that said percentage. In an embodiment, the threshold percentage may be 35%, 40%, 45%, 50%, 60%, 75%, or some other percentage. At block 240, if there are other categories that have not been analyzed, return to block 232 otherwise the process completes. Method 230 may be periodically executed, for example daily, weekly, monthly, or periodically on another interval. Method 230 may be executed after the validated URL pool 116 has been extended by a predefined number of newly validated URLs, for example after an additional 200,000 URLs are added, after an additional 300,000 URLs are added, after an additional 500,000 URLs are added, after an additional 1 million URLs are added, or after some other quantity of URLs are added. The method 230 may further comprise categorizing the URLs in the validated URL pool 116 using the primary categorization rules 110 and the secondary categorization rules 112, substantially as for the processing of blocks 218-222 described above with reference to FIG. 3B.

Figure 5:
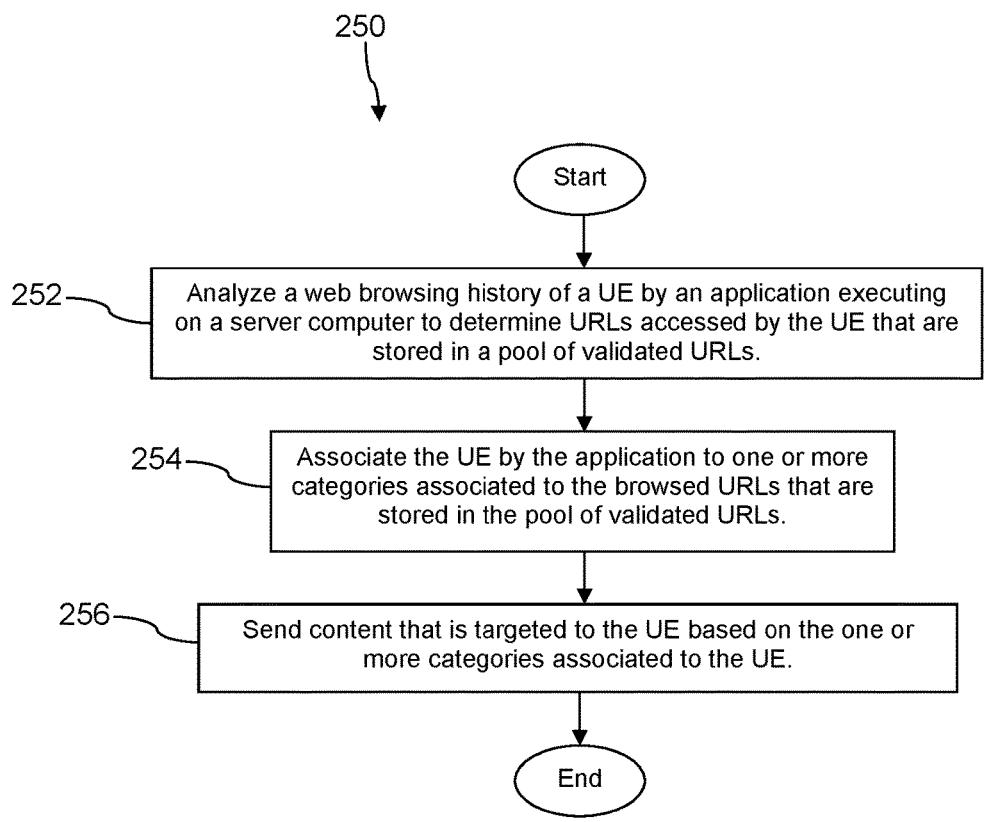
FIG. 5 is a flow chart of yet another method according to an embodiment of the disclosure.

Turning now to FIG. 5, a method 250 is described. At block 252, analyze a web browsing history of a UE by an application executing on a server computer to determine URLs accessed by the UE that are stored in the validated URL pool 116. At block 254, associate the UE by the application to one or more categories associated to the browsed URLs that are stored in the pool of validated URLs. In an embodiment, block 254 comprises performing a statistical analysis of the browsing history of the UE and associating the category of the UE to the categories that are more frequently browsed by the UE. The processing of block 254 may comprise adding the association of the UE 140 to the categories to a subscriber pattern to the subscriber patterns data store 152. The processing of blocks 252 and 254 may be performed periodically, for example once per week, once per month, once per quarter, or on some other periodic interval. The processing of blocks 252 and 254 may be performed by the subscriber patterning server 144.

At block 256, content is sent that is targeted to the UE based on the one or more categories associated to the UE. The processing at block 256 may include searching the subscriber patterns data store 152 to find UEs that are associated to a category of interest to a third party that wants to send a notification or content to UEs that commonly browse to a particular web page category. The searching in the subscriber patterns data store 152 may define additional criteria such as demographic characteristics. The processing of block 256 may be performed by the subscriber notification server 154. It is understood that the processing of method 200, method 230, and method 250 may be combined in a larger end-to-end process.

Figure 6:
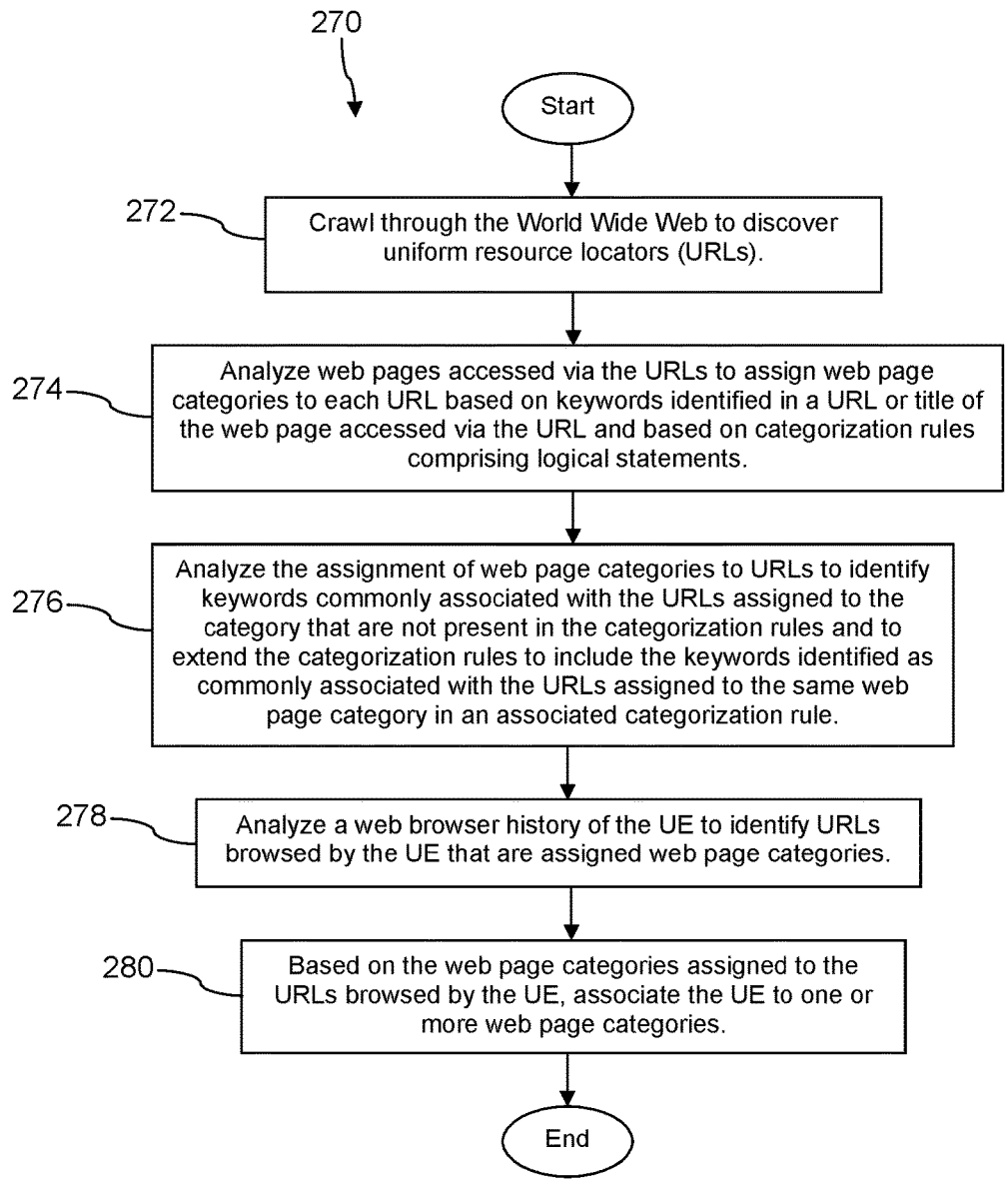
FIG. 6 is a flow chart of still another method according to an embodiment of the disclosure.

Turning now to FIG. 6, a method 270 is described. At block 272, crawl through the World Wide Web to discover universal reference locators (URLs). It is understood that the processing of block 272 does not require exhaustive crawling of the World Wide Web. Said in other words, it is not required that every web page on the World Wide Web be visited; it is not necessary that every second-level domain name on the World Wide Web be visited. In practice, crawling through a fraction of the World Wide Web second-level domain names can provide advantageous results for the methods and systems taught herein. For example, crawling through $1/40^{th}$ of the second-level domain names on the World Wide Web can produce useful results. Crawling through $1/20^{th}$ of the World Wide Web second-level domain names may produce more useful results. As is understood by those skilled in the art, crawling the web consists in recursively (1) navigating to a URL, (2) analyzing the web page referenced by the URL, (3) collecting URLs embedded in the web page, (4) adding the embedded URLs to a list of URLs to visit, and (5) repeating steps 1-4 for each URL in the list of URLs to visit (e.g., the unvalidated URL pool 114).

At block 274, analyze the web pages accessed via the URLs to assign web page categories to each URL based on keywords identified in a URL or title of the web page accessed via the URL and based on categorization rules comprising logical statements.

At block 276, analyze the assignment of web page categories to URLs to identify keywords commonly associated with the URLs assigned to the category that are not present in the categorization rules and to extend the categorization rules to include the keywords identified as commonly associated with the URLs assigned to the same web page category in an associated categorization rule. At block 278, analyze a web browser history of the UE 140 to identify URLs browsed by the UE 140 that are assigned web page categories. At block 280, based on the web page categories assigned to the URLs browsed by the UE 140, associate the UE 140 to one or more web page categories.

Figure 7:
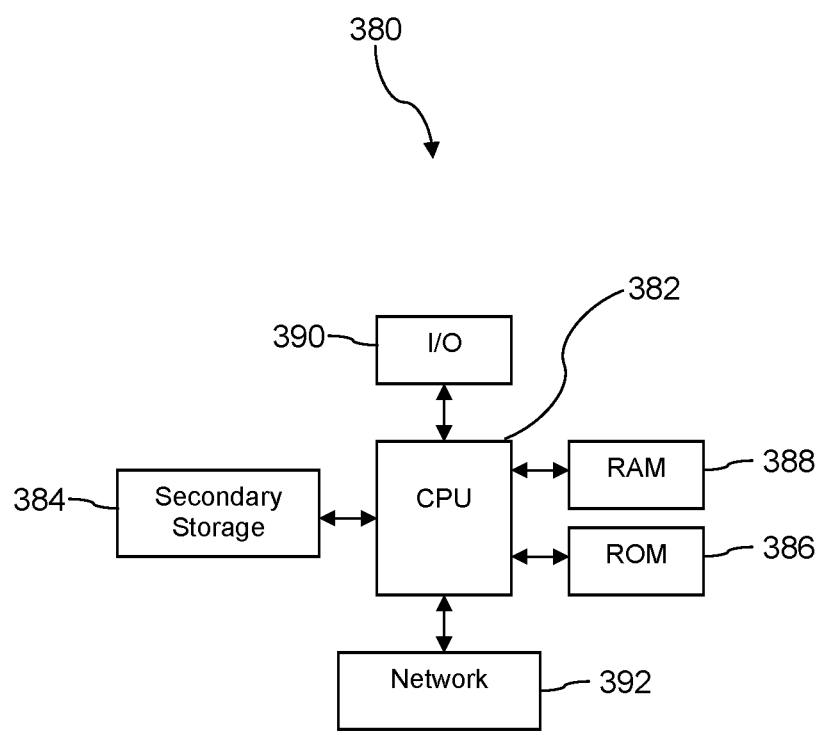
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of crawling web pages and categorizing the web pages in a two-pass process used for delivering targeted content to a user equipment (UE) based on categories of web sites browsed by the UE, comprising:

for each uniform resource locater (URL) stored in a pool of unvalidated URLs;

removing a URL from the pool of unvalidated URLs by an application executing on a server computer;

navigating to a web page referenced by the URL by the application, if navigating to the URL results in a redirect;

discarding the URL, removed from the pool of unvalidated URLs by the application;

searching for keywords in the URL and in a title of the web page referenced by the URL by the application;

searching for URLs embedded in the web page referenced by the URL by the application;

adding discovered embedded URLs to the pool of unvalidated URLs by the application;

executing a plurality of primary web site categorization rules on the keywords associated with the web page referenced by the URL by the application, where each category primary rule is associated with a single category of web page, different category primary rules associate to different categories of web pages, and each category primary rue comprises a logical statement that is true if the keywords discovered in the title of the web page referenced by the URL or in the URL make the logical statement true;

associating the URL to each category the category primary rule evaluates true by the application;

executing a plurality of secondary web site categorization rules on the keywords associated with the web page referenced by the URL by the application, where each category secondary rule is associated with a single category of web page, different category secondary rules associate to different categories of web pages, and each category secondary rule comprises a logical statement that is true if the keywords discovered in the title of the web page referenced by the URL or in the URL make the logical statement true;

associating the URL to each category the category secondary rule evaluates true by the application; and saving the URL the keywords associated with the web page referenced by the URL, and identities of categories to which the URL is associated in a pool of validated URLs by the application;

for each category of web page;

counting the number of occurrences of different keywords in the URLs stored in the pool of validated URLs that are associated to the category by the application;

counting the number of URLs stored in the pool of validated URLs that are associated to the category by the application;

for each different keyword that is not identified in a category primary rule or in a category secondary rule, determining by the application a percentage of the URLs that are associated to the category that are associated to the different keyword not identified in a rule versus the number of URLs stored in the pool of validated URLs that are associated to the category and for each said percentage that exceeds a predefined threshold percentage extending the logic of the category secondary rule by including the keyword associated with that said percentage;

analyzing a web browsing history of a UE to determine URLs accessed by the UE that ace stored in the pool of validated URLs;

associating the to one or more categories associated to the browsed URLs that are stored in the pool of validated URLs; and sending content that is targeted to the UE based on the one or more categories associated to the UE.

2. The method of claim 1, further comprising crawling the World Wide Web to obtain URLs and store them in the pool of unvalidated URLs.

3. The method of claim 1, wherein at least some of the URLs in the pool of validated URLs are associated with two or more categories.

4. The method of claim 1, wherein the URLs stored in the pool of unvalidated URLs are second-level domain names.

5. The method of claim 1, wherein analyzing the web browser history of the UE is performed periodically.

6. The method of claim 5, wherein analyzing the web browser history of the UE is performed over a recent portion of the web browser history of the UE.

7. The method of claim 6, wherein analyzing the web browser history of the UE is performed over a portion of the web browser history of the UE that extends from about the time of the previous periodic analysis of the web browser history of the UE.

8. The method of claim 5, wherein the UE associations to web page categories is replaced after the periodic analysis is completed.

9. The method of claim 5, wherein the UE associations to web page categories remain in place across a plurality of periodical analyses.

10. The method of claim 1, further comprising adapting, by the application, one or more of the plurality of secondary web site categorization rules based on the counting, for each category of web page, of the number of occurrences of different keywords in the URLs stored in the pool of validated URLs that are associated to the category.

11. The method of claim 10, further comprising, after adapting the one or more of the plurality of secondary web site categorization rules, reevaluating, by the application, each of the URLs in the pool of validated URLs using the adapted one or more of the plurality of secondary web site categorization rules.

12. The method of claim 11, wherein the counting, for each category of web page, of the number of occurrences of different keywords in the URLs stored in the pool of validated URLs that are associated to the category and the revaluating of each of the URLs stored in the pool of validated URLs is performed periodically.

13. The method of claim 11, wherein the counting, for each category of web page, of the number of occurrences of different keywords in the URLs stored in the pool of validated URLs that ace associated to the category and the revaluating of each of the URLs stored in the pool of validated URLs is performed continuously.

14. The method of claim 11, wherein the counting, for each category of web page, of the number of occurrences of different keywords in the URLs stored in the pool of validated URLs that are associated to the category and the revaluating of each of the LjRLs stored in the pool of validated URLs is performed on the event of entry of a user input command.

15. The method of claim 10, wherein adapting the one oc more of the plurality of secondary web site categorization rules comprises adding keywords to the one or more of the plurality of secondary web site categorization rules.

16. The method of claim 10, wherein adapting the one or more of the plurality of secondary web site categorization lines comprises removing keywords from the one or more of the plurality of secondary web site categorization rules.

17. The method of claim 10, wherein adapting the one or more of the plurality of secondary web site categorization rules comprises removing keywords from the one or more of the plurality of secondary web site categorization rules based on a keyword being present in more than a threshold number of categorization rules.

* * * * *